SELF-POLARIZED ELECTROSTATIC MICROPHONE-SEMICONDUCTOR AMPLIFIER COMBINATION

Filed Oct. 1, 1963 2 Sheets-Sheet 1

INVENTORS
Cornelis Wilfred REEDYK
Peter FATOVIC
BY Curphey & Erickson
PATENT AGENT SELF-POLARIZED ELECTROSTATIC MICROPHONE-SEMICONDUCTOR AMPLIFIER COMBINATION
Filed Oct. 1, 1963 2 Sheets-Sheet 2

INVENTORS
Cornelis Wilfred REEDYK
Peter FATOVIC
BY Curphey & Erickson
PATENT AGENT United States Patent Office 3,300,585
Patented Jan. 24, 1967

3,300,585
SELF-POLARIZED ELECTROSTATIC MICROPHONE-SEMICONDUCTOR AMPLIFIER COMBINATION

Cornelis Wilfred Reedyk and Peter Fatovic, Ottawa, Ontario, Canada, assignors to Northern Electric Company, Limited, Montreal, Quebec, Canada Filed Oct. 1, 1963, Ser. No. 313,021
20 Claims. (Cl. 179—1)

This invention relates to a self-polarized electrostatic microphone-semiconductor amplifier combination and is particularly well adapted for use where microphones are separated from further amplifying equipment by long transmission lines. Such circumstances are often encountered when microphones are associated with public address systems, broadcast studio equipment or are employed as telephone transmitters.

For example, in amplifying systems used in large auditoriums, long transmission lines sometimes connect a microphone located on the stage to amplifying equipment located elsewhere in the auditorium. The effect of such long transmission lines can be poor fidelity reproduction. With low impedance microphones, for example, the resistance in a long transmission line can cause a substantial signal loss, thereby resulting in a deterioration of the signal-to-noise ratio. In addition, transmission lines parallel to the cable connecting the microphone to the amplifying equipment sometimes induces undesirable cross-talk.

With high impedance microphones, the relatively large capacitance of long transmission lines causes undesirable frequency response limitations. For example, the impedance of conventional capacitor microphones is so high that transmission lines are limited to only a few feet before low frequency signal attenuation is encountered. Furthermore, a relatively large, fixed polarization voltage is required for capacitor microphones.

This problem of low frequency signal attenuation has been overcome by electrically coupling an electron tube cathode follower to the capacitor in the same microphone housing to produce a low output impedance. However, this type of microphone-amplifier combination still suffers from the disadvantages of requiring a large polarization voltage, which under certain short circuit conditions, could render the microphone useless and additionally, create a shock hazard. Furthermore, the presence of the electron tube amplifier introduces additional power requirements much of which is converted into wasted heat which is dissipated by the housing. This could be uncomfortable to a person holding the microphone.

In an article appearing in the November 1962 issue of The Journal of the Acoustical Society of America, G. M. Sessler and J. E. West describe a self-biased capacitor microphone having a capacitance of 700 picofarads. Sessler and West suggest that the lower impedance produced by their microphone eliminates the need of a cathode follower and allows the use of a long connecting cable. Although effecting some improvements over a conventional capacitor microphone without a cathode follower, the impedance of their microphone is still high enough to cause undesirable frequency response limitations for normal audio transmission lines of appreciable lengths. Furthermore, this microphone still suffers from the disadvantage of having lower amplitude output signal levels, when coupled to a low impedance transmission line, than conventional capacitor microphones employing a cathode follower amplifier.

For many years, carbon microphones have been advantageously employed as telephone transmitters, primarily because of the large signal output it supplied to the telephone transmission line. They also found wide acceptance because of their ruggedness and low cost. However, even for use as telephone transmitters, carbon microphones suffered from serious shortcomings. Because of their poor frequency response and high distortion, voice recognition problems are still encountered by telephone users. Also, cohesion of the carbon granules reduced the microphone sensitivity.

Applicants, according to their invention, have provided a microphone-semiconductor amplifier combination which produces a high amplitude output signal capable of being fed to the transmission line at low impedance; requires no polarization voltage; and has only small power requirements utilized at high efficiency, resulting in negligible heat loss. The disadvantages of the prior art are thereby overcome, rendering applicants' invention very suitable for use in amplifying systems.

Applicants, according to their invention, have produced a capacitor microphone having a capacitance in the order of 1500 picofarads. Because of the much lower impedance produced by applicants microphone, applicants discovered that a capacitor microphone-semiconductor amplifier combination could, for the first time, become a practical reality.

However, conventional semiconductor amplifiers still exhibited very low input impedance characteristics which made them unsuitable for effective electrical coupling to any capacitor microphone. Applicants, according to their invention, further discovered that the input impedance characteristics of field effect transistors render them suitable for first stage effective electrical coupling to applicants' capacitor microphone.

In addition, according to their invention, applicants have provided a microphone having all the advantages of a carbon microphone and additionally having greatly improved frequency response and distortion characteristics, thus providing the telephone industry for the first time a suitable replacement for the carbon microphone used as a telephone transmitter.

According to applicants' invention, a self-polarized electrostatic microphone-semiconductor amplifier combination is provided with effective electrical coupling therebetween.

Also according to applicants' invention, a microphone assembly is provided including a self-polarized electrostatic microphone, a semiconductor amplifier and a housing for the microphone and amplifier, including means for supporting the microphone and amplifier within the housing and means for electrically coupling the microphone to the amplifier.

Applicants' invention has the further advantage of being readily miniaturized which offers attractive possibilities for use as lapel microphones, tie clip microphones and other inconspicuous configurations.

The new microphone according to applicants' invention is not only readily adaptable to existing telephone station apparatus but since it is required to draw only a small current as compared with a carbon microphone, telephone engineers may be encouraged to effect economic modifications to the telephone subscriber's loop circuit. The greatly improved frequency response at high signal output levels fed at low impedance to the telephone subscriber's loop circuit will permit telephone subscribers to enjoy a much more faithful voice reproduction.

Preferred embodiments of applicants' invention will now be described, by way of example, with reference to the accompanying drawings where like numbers are used to identify like parts, and in which.

Figure 1:
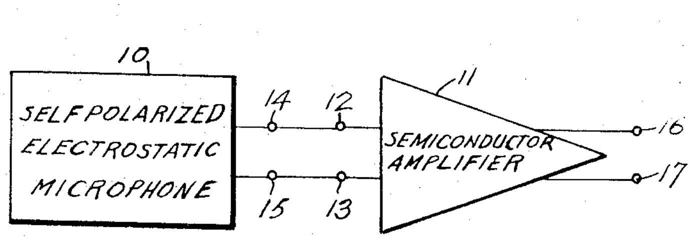
FIGURE 1 is a block schematic diagram illustrating the invention in its broadest sense.

Referring to the drawings, FIG. 1 shows a self-polarized electrostatic microphone 10 and a semiconductor amplifier 11 having its input terminals 12 and 13 electrically coupled to the output terminals 14 and 15 of microphone 10 and the amplifier 11 having output terminals 16 and 17.

As will be explained in more detail hereinafter, the microphone 10 is arranged to have its electrical impedance between terminals 14 and 15, and the amplifier 11 is arranged to have its input impedance between terminals 12 and 13 of such values so as to produce effective electrical coupling therebetween. The amplifier 11 is further arranged to have its output impedance between terminals 16 and 17 of such a value so as to permit effective electrical coupling to a suitable transmission line.

Figure 2:
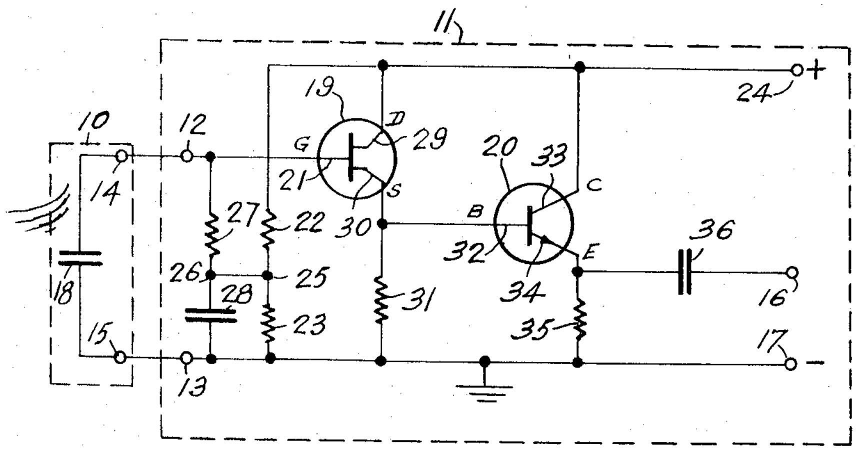
FIGURE 2 is a schematic diagram of one embodiment of applicants' invention.

Referring to FIG. 2, the microphone 10 is shown as comprising a capacitor 18 having its plates connected to terminals 14 and 15. The amplifier 11 comprises a first stage composed of a field effect transistor 19 coupled to input terminals 12 and 13 and a further stage composed of a transistor 20 coupled between the output circuit of the transistor 19 and the output terminals 16 and 17.

Terminals 12 and 13 are connected to the gate electrode 21 of the transistor 19 and ground respectively. A voltage divider comprising resistors 22 and 23 serially connected together between the positive pole 24 of a source of fixed potential and ground provides a biasing voltage for the gate electrode 21 of the transistor 19 at junction point 25, which is applied to junction point 26 of leak resistor 27 and by-pass capacitor 28 serially connected together between the gate electrode 21 and ground. The drain electrode 29 of the transistor 19 is connected to pole 24 and the source electrode 30 is connected to ground through a load resistor 31. The source electrode 30 is further connected to the base electrode 32 of transistor 20. The collector electrode 33 is connected to pole 24 and the emitter electrode 34 is connected to ground through a load resistor 35. Output terminals 16 and 17 are connected to the emitter electrode 34 through a coupling capacitor 36 and to ground respectively.

In operation, acoustic waves impinging upon the capacitor 18 are converted to electrical signals appearing between terminals 14 and 15 in a well known manner. For effective electrical coupling between the microphone 10 and the amplifier 11, the impedance between terminals 12 and 13 should be equal to or greater than the impedance between terminals 14 and 15. Applicants have found that a capacitance of about 1500 picofarads for capacitor 18 to produce an impedance between terminal 14 and 15 of about 300 kilohms at 300 cycles per second gives good results. The impedance between terminals 12 and 13 can be readily arranged for effective electrical coupling to the capacitor microphone 10 by suitably adjusting the values of the amplifier circuit components.

The electrical signals appearing between terminals 12 and 13 are amplified by the field effect transistor 19 and the transistor 20 and applied between output terminals 16 and 17. The field effect transistor 19 is connected in source follower configuration to present optimum high impedance characteristics between input terminals 12 and 13, and transistor 20 is connected in emitter follower configuration to present optimum low impedance characteristics between output terminals 16 and 17 for effective electrical coupling to a suitable transmission line.

Figure 3:
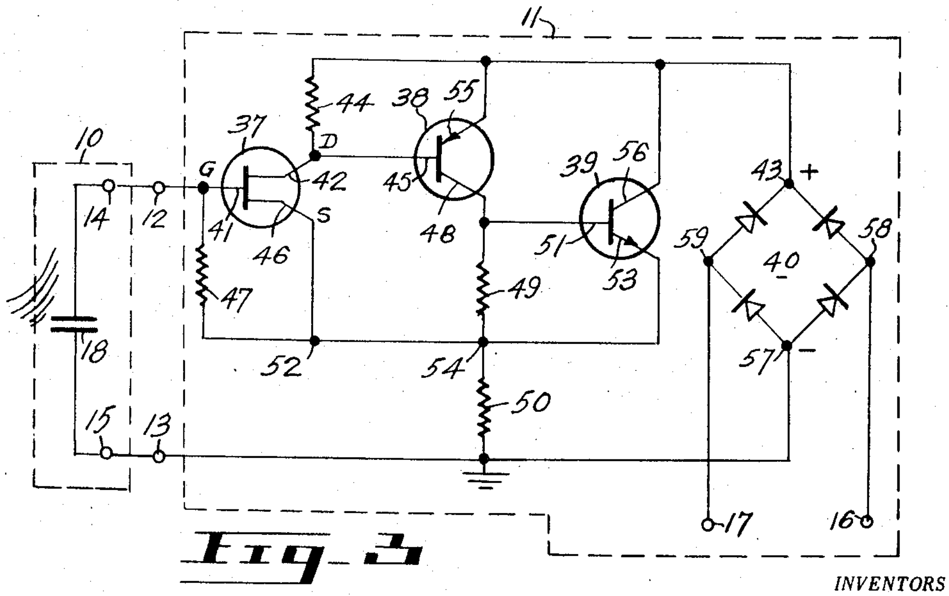
FIGURE 3 is a schematic diagram of another embodiment of applicants' invention.

FIG. 3 shows another embodiment of applicants' invention which is suitable for application as a telephone transmitter. The plates of capacitor 18 are connected to terminals 14 and 15 as before. The amplifier 11 comprises a single stage amplifier composed of transistors 37, 38 and 39 and a diode bridge circuit 40 coupled in the order named between terminals 12, 13 and terminals 16, 17.

The terminals 12 and 13 are connected to the gate electrode 41 of the transistor 37 and ground respectively. The drain electrode 42 is connected to bridge terminal 43 through a current shunting resistor 44 and to the base electrode 45 of the transistor 38. The gate electrode 41 and source electrode 46 are connected together through a leak resistor 47. Collector electrode 48 of the transistor 38 is connected to ground through series resistors 49 and 50 and to the base 51 of the transistor 39. The junction point 52 between source electrode 46 and gate electrode 41 of transistor 37, and the emitter electrode 53 of the transistor 39 are connected to the junction point 54 beween resistors 49 and 50. The emitter electrode 55 of the transistor 38 and the collector electrode 56 of the transistor 39 are each connected to the terminal 43 of the bridge circuit 40. Bridge terminal 57 is connected to ground and bridge terminals 58 and 59 are connected to terminals 16 and 17 respectively.

Terminals 16 and 17 are adapted to be connected to a source of direct current which, where this embodiment of applicants' invention is employed as a telephone transmitter, would be a telephone subscribers loop circuit.

As in the embodiment of FIG. 2, acoustic waves impinging upon the capacitor 18 are converted to electrical signals appearing between terminals 14 and 15 which are coupled to input terminals 12 and 13. The direct current applied to terminals 16 and 17 from the subscribers loop circuit, regardless of polarity, causes the bridge circuit 40 to have positive polarity at bridge terminal 43 and negative polarity at bridge terminal 57. This direct current serves as a power supply for transistors 37, 38 and 39.

The electrical signals appearing between terminals 12 and 13 are amplified in transistors 37, 38 and 39 and are caused to modulate the current drawn from the power supply. This modulated current flows back through the bridge circuit 40 and causes a fluctuating potential to appear at terminals 16 and 17.

Connected in the manner shown, transistors 37, 38 and 39 act as a three terminal single stage amplifier having an input terminal 12, an output terminal 43 and a common terminal 54. Resistor 44 is provided to bias the field effect transistor 37. Resistor 47 is provided to allow the gate electrode 41 of the transistor 37 to operate at zero potential difference with respect to the source electrode 46. Resistor 49 is a biasing resistor and resistor 50 is a feedback resistor.

The amplifier 11 is arranged to provide sufficient gain so as to present a signal to a load, such as a telephone subscribers loop circuit, of approximately 0 to 10 dbm for normal telephone users' speech levels. The minimum fixed potential normally encountered at the transmitter end of the subscribers loop is about 3 volts. Under these conditions, the amplifier 11 is arranged to draw about 15 milliamperes of current.

Figure 4:
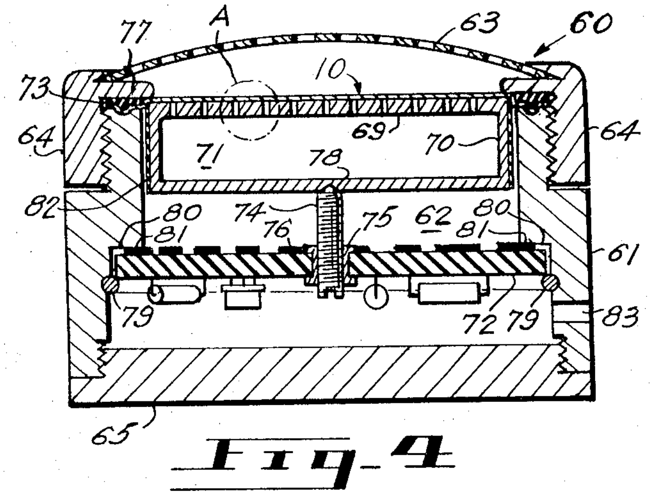
FIGURES 4 and 5 are sectional views of mechanical arrangements suitable for accommodating the embodiment of FIG. 2 or FIG. 3.

FIG. 4 shows a microphone assembly suitable for housing the circuits of FIG. 2 or FIG. 3. The assembly comprises a housing 60 composed of an electrically conductive annular frame 61 defining a chamber 62, first protective means shown as a screen 63, clamping means shown as a threaded cap 64 and second protective means shown as a threaded cover 65.

Figure 6:
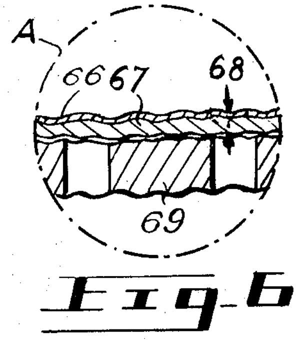
FIGURE 6 is a greatly magnified view of a portion of FIGS. 4 or 5 showing details of the microphone components.

The microphone 10, as best shown in the greatly magnified section A (FIG. 6), comprises a capacitor composed of a thin metal coating 66 deposited on one side of a thin dielectric 67 of electret material to form a laminated diaphragm 68, and a perforated or indented metal plate 69, (herein shown as perforated) supported against the other side of the dielectric 67. As shown in FIG. 4, this plate 69 forms one end of a cylinder 70 which is closed at the other end to define an acoustic chamber 71.

The amplifier 11 can be suitably mounted on an annular printed circuit board 72 with the copper side facing the microphone and the component side facing the cover 65.

Means are provided for supporting the microphone within the housing 60 comprising a metal ring 73 serving as means for supporting the diaphragm 68 flush against the metal plate 69, and an electrically conductive lead screw 74 threaded through an electrically conductive insert 75 fixed to a first conductive ring 76 mounted approximately at the center of the board 72. The ring 73 is located on the periphery of the diaphragm 68, which is sandwiched between a flange 77 on the cap 64 and the end walls of the frame 61. The cap 64 also joins the screen 63 to the frame 61. The ring 73 holds the diaphragm taut and flat and the screw 74 makes contact with a notch 78 in the closed end of the cylinder 70 and serves as a means to urge the plate 69 flush against the dielectric 67.

A ring 79 serves as a means for supporting the amplifier within the housing by securing the board 72 against a flange 80 protruding from the internal walls of the frame 61.

A second conductive ring 81 is mounted about the periphery of the board 72. Rings 76 and 81 serve as the input terminals of the amplifier. A conductive path defined by the cylinder 70, the screw 74, the insert 75 and the ring 76; and a conductive path defined by coating 66, ring 73, cap 64, frame 61 and ring 81 serve as means for electrically coupling the microphone to the input terminals of the amplifier. Insulating material 82 insulates the frame 61 from the cylinder 70. Leads from the amplifier output and from power supply terminals may be passed through an aperture 83 in the frame 61.

Figure 5:
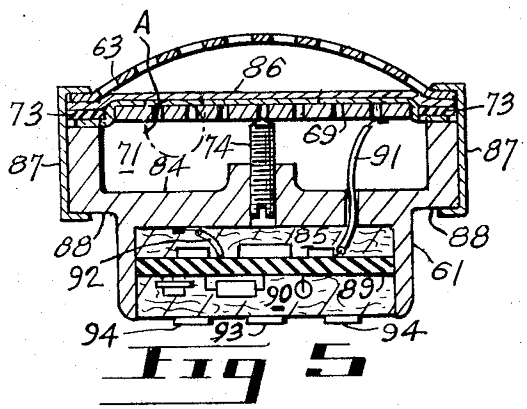

The assembly shown in FIG. 5 has been designed to render it suitable as a replacement for a carbon microphone telephone transmitter.

In this embodiment, the acoustic chamber 71 is enclosed by the internal walls of the frame 61, the plate 69 and a partition 84. The walls of the frame 61 extend beyond the partition 84 to define a further chamber 85.

The first protective means comprises a screen 63 and a thin protective diaphragm 86. The clamping means comprises a cylindrical clamp 87 acting against the screen 63 and an outside flange 88 of the frame 61. The lead screw 74 is of insulating material and extends through an aperture in the partition 84.

The amplifier is mounted on an annular insulated chassis 89 which is supported within the chamber 85 by encapsulation in an insulating compound 90 such as an epoxy.

Electrical coupling to the microphone can readily be accomplished by a wire 91 connecting the plate 69 to one input terminal through an aperture in the partition 84, and a wire 92 connecting the partition 84 to the other input terminal. A conductive path is thus defined by the frame 61, the clamp 87, the ring 73 and the coating 66.

The amplifier output terminals can be readily arranged for external spring contact connection by using a conductive button 93 and a conductive ring 94.

It should be understood that the amplifier may take many mounting forms such as a printed circuit, a thin film circuit, or an integrated circuit, which would suggest to those skilled in the art various alternative supporting and coupling arrangements. It should also be understood that the housing could take various alternative forms well within the scope of applicants' invention.

The diaphragm 68 can be formed by depositing a thin layer of aluminum on one surface of a thin sheet of plastic material (say ¼ mil thick) such as polyethylene terephthalate, sold under the trademark Mylar. The diaphragm 68 can be prepolarized to form an electret by heating it to about 120° C., exposing it to an electrostatic field having a potential gradient of 20 kv. per cm., and allowing it to cool slowly in the field. A polarization of the dielectric 67 results converting it into an electret. This provides self-polarization for the microphone 10 thereby eliminating the need for an external power supply.

Applicants have found that optimum sensitivity is achieved in a microphone having a dielectric of about 1½ inches in diameter and ¼ mil thick by adjusting the tautness of the diaphragm 68 so as to produce an effective capacitance of about 1500 picofarads.

Thus, according to applicants' invention, a high quality microphone-amplifier combination has been provided having advantages which make it useful in the broadcasting, public address and telephone fields. In addition, it lends itself to miniaturization for special applications.

What is claimed is:

1. In combination, a self-polarized electrostatic microphone and a semiconductor amplifier having its input electrically coupled to said microphone, said microphone being arranged to have its electrical impedance, and said amplifier being arranged to have its input impedance, of such values so as to produce effective electrical coupling therebetween.

2. The combination as defined in claim 1 wherein said amplifier is arranged to have its output impedance of such a value so as to permit effective electrical coupling to a transmission line.

3. The combination as defined in claim 1 wherein said microphone comprises a capacitor composed of a thin dielectric of electret material, and a pair of plates one plate being a thin metal coating deposited on one side of said dielectric to form a laminated diaphragm, and the other plate being a perforated metal plate flush against the other side of said diaphragm; said amplifier having input terminals, each said capacitor plate being electrically coupled to a respective said input terminal.

4. The combination as defined in claim 1 wherein said microphone comprises a capacitor composed of a dielectric of thin prepolarized plastic material, forming an electret, and a pair of plates one plate being a thin metal coating on one side of said electric to form a laminated diaphragm, and the other plate being a perforated metal plate flush against the other side of said diaphragm; said amplifier having input terminals, each said capacitor plate being electrically coupled to a respective said input terminal.

5. The combination as defined in claim 1 wherein said microphone comprises a capacitor composed of a dielectric of thin prepolarized plastic material forming an electret, and a pair of plates; one plate being a thin metal coating on one side of said dielectric to form a laminated diaphragm, and the other plate being a perforated metal plate flush against the other side of said diaphragm; said amplifier having input terminals, each said capacitor plate being electrically coupled to a respective said input terminal, the capacitance of the capacitor being about 1500 picofarads.

6. The combination as defined in claim 1 wherein the first stage of said amplifier comprises a field effect transistor.

7. The combination as defined in claim 2 wherein the fitrst stage of said amplifier comprises a field effect transistor, and wherein the last stage is connected in emitter follower configuration.

8. The combination as defined in claim 2 wherein said amplifier is a single stage amplifier comprising three transistors, the first transistor being a field effect transistor, the input to said stage being connected to said input terminals, the output from said stage being connected to said output terminals, said output terminals being adapted to be connected to a source of direct current, said source serving as a power supply for said stage, whereby amplified signals in said stage modulate said direct current.

9. The combination as defined in claim 8 wherein said direct current can be of either polarity, and including means connected between said output terminals and the output from said stage for causing said direct current applied to said stage to be of predetermined polarity.

10. In combination, an electrostatic microphone comprising a capacitor composed of a thin metal coating, a perforated metal plate and a thin dielectric of pre-polarized plastic material forming an electret, said coating being deposited on one side of said dielectric to form a laminated diaphragm, said plate being flush against the other side of said electret; and an amplifier comprising a pair of input terminals and a pair of output terminals, said input terminals being electrically coupled to said capacitor, a first stage comprising a field effect transistor and a last stage responsive to the output of said first stage connected in an emitter follower configuration to said output terminals.

11. A microphone assembly comprising a housing; a self-polarized electrostatic microphone; a semiconductor amplifier having a pair of input terminals and a pair of output terminals; means for supporting said microphone and means for supporting said amplifier within said housing; and means for electrically coupling said microphone to said input terminals; said microphone being arranged to have its electrical impedance, and said amplifier being arranged to have the impedance between its input terminals of such values so as to produce effective electrical coupling therebetween.

12. An assembly as defined in claim 11 wherein said amplifier is arranged to have the impedance between its output terminals of such a value so as to permit effective electrical coupling to a transmission line.

13. An assembly as defined in claim 1 wherein said microphone comprises a capacitor composed of a thin dielectric of electret material and a pair of plates, one plate being a thin metal coating deposited on one side of said dielectric to form a laminated diaphragm, and the other plate being a perforated metal plate adapted to be supported flush against the other side of said diaphragm.

14. An assembly as defined in claim 13 wherein the housing comprises an annular frame defining a chamber, protective means adapted to close one end of the chamber, said microphone supporting means comprising means for supporting said diaphragm flush against said metal plate with said metal coating facing the protective means, and clamping means for joining said protective means and a portion of said microphone supporting means to said frame.

15. An assembly as defined in claim 14 wherein said means for supporting said diaphragm flush against said metal plate includes an annular ring located on the periphery of said metal coating, said ring and said diaphragm being sandwiched between said clamping means and a wall of the frame, and means for urging said plate flush against said dielectric.

16. An assembly as defined in claim 15 including means for insulating said metal plate from said frame.

17. An assembly as defined in claim 16 wherein said metal plate has a plurality of apertures therein and forms one end of a cylinder closed at both ends, said cylinder forming an acoustic chamber.

18. An assembly as defined in claim 17 wherein said frame is electrically conductive and said amplifier is mounted on an annular board having an etched copper circuit on a side thereof; one said input terminal comprises a first conductive ring mounted approximately at the center of the copper side of said board and the other said input terminals comprises a second conductive ring mounted about the periphery of the copper side of said board; said amplifier supporting means comprising a ring for securing said board against a flange protruding from the internal walls of said chamber with said second conductive ring making electrical contact with said flange; said plate urging means comprises an electrically conductive lead screw threaded through an electrically conductive insert fixed to said first conductive ring to make electrical and physical contact with the closed end of said cylinder; said electrical coupling means comprises the conductive path defined by said cylinder, said screw, said insert and said first conductive ring, and the conductive path defined by said coating, said metal ring, said clamping means, said farme and said second conductive ring; and protective means for said amplifier closing the other end of said chamber.

19. An assembly as defined in claim 16 wherein a partition closes the other end of said chamber to form an acoustic chamber enclosed by the internal walls of said frame, said metal plate and said partition.

20. An assembly as defined in claim 19 wherein said frame is electrically conductive; partition means for closing off the other end of said chamber, the walls of said frame extend beyond said partition to define a further chamber; said amplifier is mounted on an annular insulated chassis; said plate urging means comprises an electrically insulated lead screw threaded through an aperture in said partition to make physical contact with said plate; said amplifier supporting means comprises an insulating compound for encapsulating said chassis within said further chamber; said output terminals are arranged for external spring contact connection; said electrical coupling means comprises a wired connection from said plate to one said input terminal through an aperture in said partition, and a wired connection from said frame to the other said input terminal, and a conductive path defined by said frame, said clamping means said metal ring and said coating.

References Cited by the Examiner

UNITED STATES PATENTS

| | | | |
|---|---|---|---|
| 2,024,705 | 12/1935 | Rutherford | 179—111 |
| 2,857,462 | 10/1958 | Lin | 179—1 |
| 2,875,285 | 2/1959 | Hightower | 179—81 X |
| 3,118,979 | 1/1964 | Sessler et al. | 179—111 |
| 3,210,677 | 10/1965 | Lin et al. | 330—38 |
| 3,218,395 | 11/1965 | Suda | 179—84 |

OTHER REFERENCES

Electronic Design, "Additional Applications," page 45.

KATHLEEN H. CLAFFY, *Primary Examiner.*

J. W. JOHNSON, H. ZELLER, *Assistant Examiners.*